US012559106B1

(12) United States Patent (10) Patent No.: US 12,559,106 B1

Reese, II (45) Date of Patent: Feb. 24, 2026

(54) SYSTEM AND METHOD FOR DETECTING AND REACTING TO BLACK ICE DRIVING CONDITIONS

(71) Applicant: FCA US LLC, Auburn Hills, MI (US)

(72) Inventor: Ronald A Reese, II, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/925,199

(22) Filed: Oct. 24, 2024

(51) Int. Cl.
| | |
|---|---|
| *B60W 30/18* | (2012.01) |
| *B60W 50/14* | (2020.01) |
| *G06V 20/56* | (2022.01) |

(52) U.S. Cl.
CPC ...... *B60W 30/18172* (2013.01); *B60W 50/14* (2013.01); *G06V 20/588* (2022.01); *B60W 2050/146* (2013.01); *B60W 2520/14* (2013.01); *B60W 2520/28* (2013.01); *B60W 2555/20* (2020.02); *B60W 2720/403* (2013.01)

(58) Field of Classification Search
CPC .......... B60W 10/14; B60W 2050/146; B60W 2520/28; B60W 2555/20; B60W 2720/403; B60W 10/16; B60W 10/119; B60W 30/18172; B60W 2520/26; B60W 2520/263; B60W 2520/266; B60W 2552/40; G06V 20/588
USPC ............................ 701/65, 73, 76, 87, 88, 89
See application file for complete search history.

(56) References Cited

U.S. PATENT DOCUMENTS

| | | | | |
|---|---|---|---|---|
| 4,712,635 A | * | 12/1987 | Sumiya ................. | B60K 23/08 180/197 |
| 9,481,243 B2 | * | 11/2016 | Larkin ................... | B60K 23/08 |
| 10,289,920 B2 | * | 5/2019 | Hartmann .............. | G06V 20/56 |
| 2004/0204812 A1 | * | 10/2004 | Tran ....................... | G01N 21/84 701/80 |
| 2018/0362021 A1 | * | 12/2018 | Imamura .............. | B60W 10/06 |
| 2024/0200974 A1 | * | 6/2024 | Young ................... | G06V 20/56 |

* cited by examiner

*Primary Examiner* — Roger L Pang

(74) *Attorney, Agent, or Firm* — Jeremy J. Klobucar

(57) ABSTRACT

A vehicle system for a vehicle that detects and reacts to a black ice driving condition includes a motor, at least one sensor, an instrument panel cluster and a controller. The motor provides drive torque to a driveline having at least one wheel of the vehicle wheels for propelling the vehicle, the vehicle wheels including left and right rear wheels and left and right front wheels. The at least one sensor includes an advanced driver assistance system (ADAS) having a camera that generates a video input signal. The instrument panel cluster is configured to display a message indicative of a black ice driving condition. The controller receives the video input signal; determines whether a black ice condition has been satisfied; communicates a signal to the instrument panel cluster for displaying a black ice driving condition; and commands a corrective action based on the black ice condition being satisfied.

19 Claims, 2 Drawing Sheets

SYSTEM AND METHOD FOR DETECTING AND REACTING TO BLACK ICE DRIVING CONDITIONS

FIELD

The present disclosure relates generally to a system and method for detecting and reacting to black ice driving conditions.

BACKGROUND

Some driving conditions are difficult to properly assess while driving. Furthermore, in some instances road conditions can change rapidly without warning. For example, such as when driving in cold wintery conditions, a road surface can change from being simply wet one moment and shortly thereafter can turn to ice. When encountering icy conditions, especially when a driver is not anticipating such conditions, the driver is more susceptible to losing control of the vehicle. Many vehicles are equipped with driver stability systems, such as traction control systems, that attempt to mitigate any loss of control once detected. However, there remains a need for improvement in the relevant art.

SUMMARY

In one example aspect of the invention, a vehicle system for a vehicle that detects and reacts to a black ice driving condition includes a motor, at least one sensor, an instrument panel cluster and a controller. The motor provides drive torque to a driveline having at least one wheel of the vehicle wheels for propelling the vehicle, the vehicle wheels including left and right rear wheels and left and right front wheels. The at least one sensor includes an advanced driver assistance system (ADAS) having a camera that generates a video input signal. The instrument panel cluster is configured to display a message indicative of a black ice driving condition. The controller receives the video input signal; determines, based on the video input signal, whether a black ice condition has been satisfied; communicates, based on the black ice condition being satisfied, a signal to the instrument panel cluster for displaying a black ice driving condition; and commands, at the driveline, a corrective action based on the black ice condition being satisfied.

In another aspect, the at least one sensor further comprises a yaw sensor that provides a yaw sensor signal and wherein the controller further determines whether the black ice conditions have been satisfied based on the yaw sensor signal.

In some implementations, the at least one sensor further comprises an ambient temperature sensor that provides a temperature sensor signal and wherein the controller further determines whether the black ice conditions have been satisfied based on the temperature sensor signal.

In some configurations, the at least one sensor further comprises at least one of a humidity sensor that provides a humidity sensor signal, a rain sensor that provides a rain sensor signal, and a windshield wiper sensor that provides a windshield wiper sensor signal, and wherein the controller further determines whether the black ice conditions have been satisfied based on at least one of the humidity sensor signal, the rain sensor signal, and the windshield wiper sensor signal.

According to additional examples, the at least one sensor further comprises wheel speed sensors configured at each of the left and right rear wheels and the left and right front wheels, and wherein the controller determines whether the black ice conditions has been satisfied based on a wheel speed sensor having a distinct wheel speed signal compared to a remainder of the wheel speed sensors.

In additional implementations, the controller determines whether a black ice condition has been satisfied based on a determination, from the video input signal, that water splashing is initially detected from a nearby vehicle and subsequently not detected from the nearby vehicle.

In examples, the controller determines whether a black ice condition has been satisfied based on a determination, from the video input signal, that tire marks are initially detected on a roadway from a nearby vehicle and subsequently not detected from the nearby vehicle.

In other examples, the controller commands a corrective action at the driveline including commanding a mode change from a two-wheel drive mode to one of an all-wheel drive mode and a four-wheel drive mode.

In other implementations, the controller commands a corrective action at the driveline including commanding more drive torque at the left and right front wheels than the left and right rear wheels.

A method for detecting and reacting to a black ice driving condition on a vehicle is provided. The vehicle having: a motor that provides drive torque to a driveline having at least one wheel of the vehicle wheels for propelling the vehicle, the vehicle wheels including left and right rear wheels and left and right front wheels; at least one sensor including an advanced driver assistance system (ADAS) having a camera that generates a video input signal; an instrument panel cluster configured to provide a warning (display a message and/or provide audible warning) indicative of a black ice driving condition; and a controller, the method comprises: receiving the video input signal; determining, based on the video input signal, whether a black ice condition has been satisfied; communicating, based on the black ice condition being satisfied, a signal to the instrument panel cluster for displaying a black ice driving condition; and commanding, at the driveline, a corrective action based on the black ice condition being satisfied.

In another aspect of the method, the at least one sensor further comprises a yaw sensor that provides a yaw sensor signal and wherein the controller further determines whether the black ice conditions have been satisfied based on the yaw sensor signal.

In some implementations of the method, the at least one sensor further comprises a temperature sensor that provides a temperature sensor signal and wherein the controller further determines whether the black ice conditions have been satisfied based on the temperature sensor signal.

In some configurations of the method, the at least one sensor further comprises at least one of a humidity sensor that provides a humidity sensor signal, a rain sensor that provides a rain sensor signal, and a windshield wiper sensor that provides a windshield wiper sensor signal, and wherein the controller further determines whether the black ice conditions have been satisfied based on at least one of the humidity sensor signal, the rain sensor signal, and the windshield wiper sensor signal.

According to additional examples of the method, the at least one sensor further comprises wheel speed sensors configured at each of the left and right rear wheels and the left and right front wheels, and wherein the controller determines whether the black ice conditions have been satisfied based on a wheel speed sensor having a distinct wheel speed signal compared to a remainder of the wheel speed sensors.

In additional implementations of the method, the controller determines whether a black ice condition has been satisfied based on a determination, from the video input signal, that water splashing is initially detected from a nearby vehicle and subsequently not detected from the nearby vehicle.

In examples of the method, the controller determines whether a black ice condition has been satisfied based on a determination, from the video input signal, that tire marks are initially detected on a roadway from a nearby vehicle and subsequently not detected from the nearby vehicle.

In other examples of the method, the controller commands a corrective action at the driveline including commanding a mode change from a two-wheel drive mode to one of an all-wheel drive mode and a four-wheel drive mode.

In other implementations of the method, the controller commands a corrective action at the driveline including commanding more drive torque at the left and right front wheels than the left and right rear wheels.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As identified above, when driving in cold wintery conditions, a road surface can change from being simply wet to ice without warning. When encountering icy conditions, especially when a driver is not anticipating such conditions, the vehicle is more susceptible to losing control. While many vehicles are equipped with vehicle stability systems, such as traction control systems, that mitigate any loss of control once detected, it would be desirable to anticipate potential black ice conditions before they are encountered. In this regard it would be desirable to detect black ice and take corrective actions to avoid any loss of control (i.e., never need to engage the stability control system). For the purposes of discussion, the term "black ice" is used herein to refer to a road surface at least partially covered with ice and difficult to identify by observation.

The present disclosure provides a system and method for detecting and reacting to black ice driving conditions. A controller receives sensor inputs from vehicle sensors and determines whether black ice conditions have been met based on the sensor inputs. If the controller determines that one or more thresholds have been met to satisfy a black ice condition, a signal is communicated to a human interface module (e.g., such as an instrument cluster, a heads up display, or infotainment system, etc.) that warns the driver of driving conditions that satisfy black ice. Corrective actions are implemented to mitigate the risk of loss of control of the vehicle.

Figure 1:
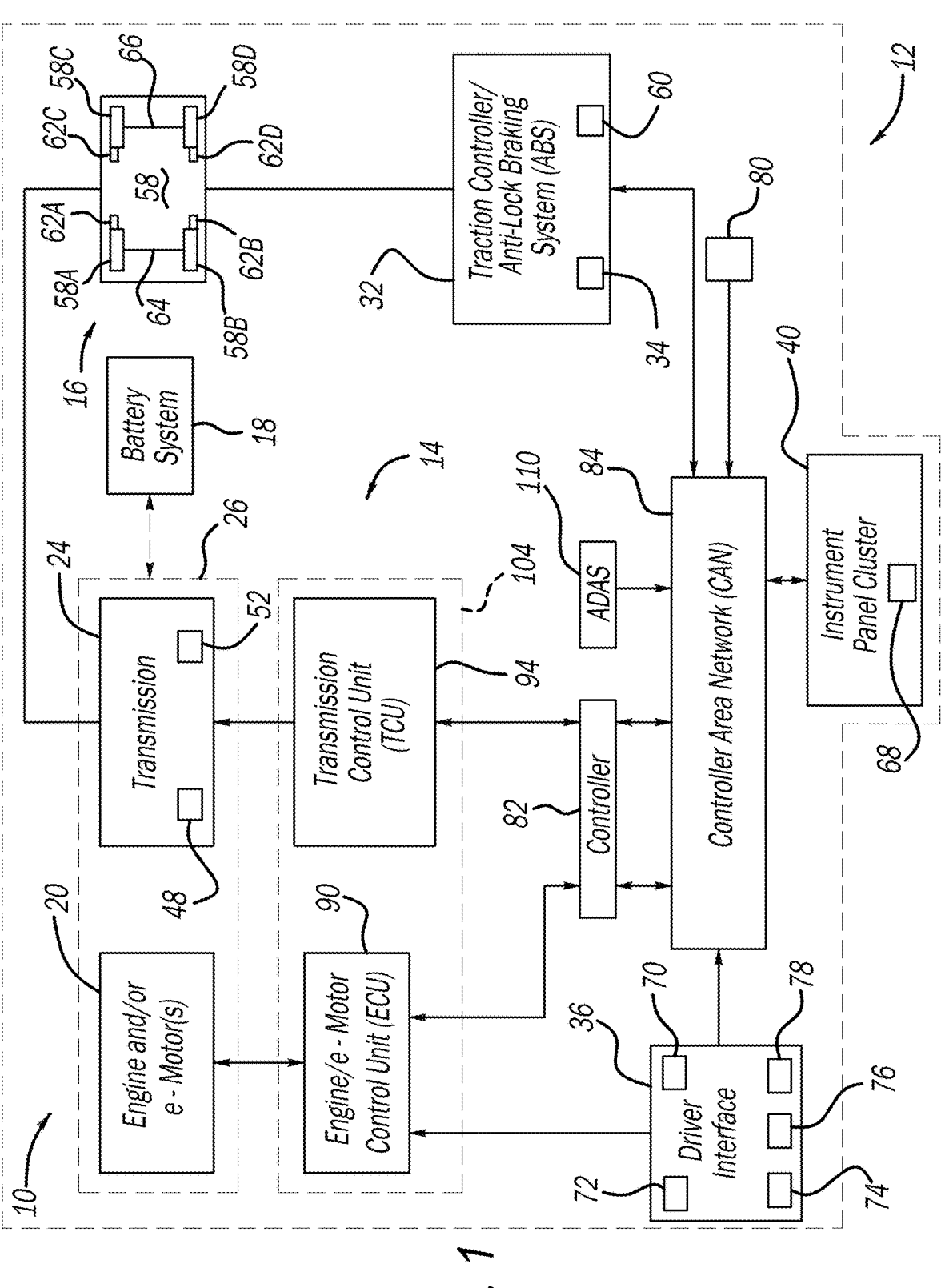
FIG. 1 is a schematic block diagram of an exemplary vehicle system according to the principles of the present disclosure.

With initial reference to FIG. 1, an exemplary vehicle system is schematically shown and generally identified at reference numeral 10. The exemplary vehicle system 10 is associated with an exemplary vehicle 12 and includes a powertrain 14 configured to transfer drive torque to a driveline 16 of the vehicle 12 for propulsion. The powertrain 14 generally comprises a high voltage battery system 18, a motor 20 including at least one of an internal combustion engine (ICE) and one or more electric motors, and a transmission 24. The motor 20 and the transmission 24 can be collectively referred to herein as a drive module 26. While the exemplary implementation includes a transmission 24, in some examples the powertrain 14 does not include a transmission.

The vehicle system 10 further includes a traction controller and/or an anti-lock brake system (ABS) 32. While shown together it will be appreciated that the vehicle system can have a dedicated traction control system that operates independent of an anti-lock brake system. A yaw sensor 34 can be provided on the vehicle system 10 such as part of the traction controller ABS 32. The yaw sensor 34 is configured to sense a yaw condition of the vehicle 12. The vehicle system 10 further includes a driver interface 36 and an instrument panel or cluster 40. The instrument panel or cluster 40 can include any interface device, such as a driver information center, and/or vehicle infotainment system capable of receiving input from a driver.

As identified above, the motor 20 includes at least one of an internal combustion engine (ICE) and one or more electric motors. As such, the vehicle 12 can be powered exclusively by an ICE, exclusively by one or more electric motors, or can be powered by any combinations of and ICE and electric motors. The transmission 24 includes various transmission speed sensors, such as input and output transmission shaft speed sensors 48 and various shift sensors 52, to provide a signal to an associated control system indicative of a transmission gear selected. The transmission 24 and traction controller 32 are coupled or selectively coupled, directly or indirectly, to one or more wheels 58 of vehicle 12, as is known in the art. In the exemplary vehicle system, all of the wheels 58 are drive wheels that receive torque input.

The wheels 58 are identified individually as front wheels 58A, 58B and rear wheels 58C, 58D. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. In the exemplary implementation illustrated, the traction controller 32 is controlled to activate foundation brakes 60.

The instrument panel cluster 40 includes various indicators, such as a black ice warning light or indicator 68. The driver interface 36 includes a steering wheel 70 and a brake pedal 72. The driver interface 36 includes a driver input device, e.g., an accelerator pedal 74, for providing a driver input, e.g., a torque request, for the motor 20. The driver interface 36 can further include a park brake 76. The driver interface 36 or vehicle interior also includes a transmission shift request device, such as a shift lever or rotary shifter 78, for the driver to request a desired gear of the transmission 24. The shift lever or rotary shifter 78 can provide conventional transmission options including park, reverse, neutral, drive and low.

One or more controllers 82 are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

The vehicle system 10 also includes sensors 80. The sensors 80 can provide inputs to the CAN 84 and therefore the controller 82 indicative of an ambient temperature, a humidity, a status of a rain sensor, a status of a windshield wiper sensor, a status of a rear window defroster or other sensor that provides input indicative of a weather condition experienced by the vehicle 12.

The vehicle system 12 includes an advanced driver assistance system (ADAS) 110 that communicates signals to the controller 82 indicative of driving conditions. In examples, the ADAS 110 can include one or more cameras, radar/LIDAR sensors, and ultrasound sensors that detect obstacles and/or driving conditions. In examples, the controller 82 can communicate signals to the instrument panel cluster 40 to alert the driver of sensed conditions. As discussed further herein, a camera of the ADAS 110 can provide a video input to the controller 82. The controller 82 can make interpretations of the video input, such as by way of artificial intelligence learning algorithms, indicative of a black ice condition. For example, the controller 84 can determine that black ice has been detected based on video analysis of water splashing from a nearby vehicle detected for a period of time and then not detected (while satisfying other enable conditions such as temperature, humidity, etc.) In other examples, the controller 84 can determine that black ice has been detected based on tire marks from a nearby vehicle is detected for a period of time and then not detected (while satisfying other enable conditions such as temperature, humidity, etc.). Such scenarios can satisfy a black ice enable condition where the vehicle system 14 alerts the driver and/or performs corrective actions.

In the example illustrated in FIG. 1, the vehicle system 10 includes an engine control unit (ECU) 90 for controlling the motor(s) 20, and a transmission control unit (TCU) 94 for controlling the transmission 24. Both of the control units 90 and 94 as well as the traction controller 32, driver interface 36, instrument cluster 40 and sensors 80 are in communication with CAN 84 and thus each other. Again, in some examples a transmission 24 and therefore the TCU 94 is not included. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Figure 2:
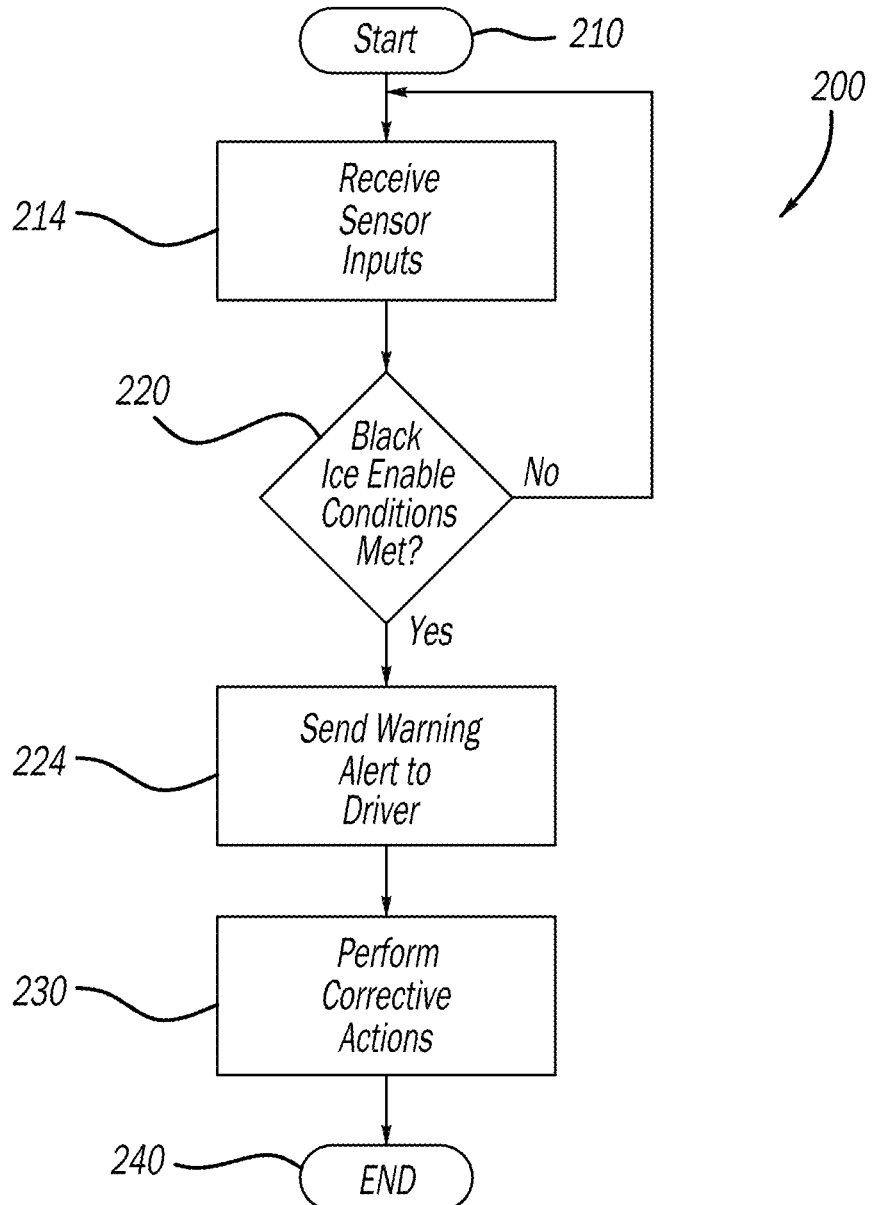
FIG. 2 is an example functional block diagram of a method implemented by an exemplary controller of the vehicle system of FIG. 1 according to the principles of the present disclosure.

Referring now to FIG. 2, and with reference back to FIG. 1, an exemplary method of implementing the vehicle system 10 is shown and generally identified at reference numeral 200. The method starts at 210. At 214 the controller 82 receives sensor inputs. As described herein, the sensor inputs can be any input that relates to driving conditions. For example, the sensor inputs can include inputs from the sensors 80 related to ambient temperature, humidity, windshield wiper status and rear window defrost status. Other sensor inputs include signals from the ADAS 110 (such as, but not limited to camera video, radar/LIDAR sensor data, and ultrasound data). Furthermore, sensor inputs can include signals from the yaw sensor 34 indicative of a vehicle yaw situation. The controller 82 can further receive signals from the wheel speed sensors 62A-62D indicative of a speed differential between one wheel and another wheel.

At 220, the controller 82 determines whether black ice conditions have been met based on the sensed inputs. It is contemplated that the controller 82 can compare one or more inputs described above to various thresholds and a black ice condition can be satisfied based on one or more thresholds being satisfied. In some implementations, it is contemplated that black ice conditions can be communicated between nearby vehicles in a connected car scenario. In some implementations a connected car may detect and communicate a black ice condition to a cloud where nearby vehicles could access such information and implement corrective actions. If black ice conditions have not been met, control loops to 214. If black ice conditions have been met, control sends a warning alert to the driver such as at the instrument panel cluster 40. In examples, a continuous warning (e.g., "possible unsafe road conditions/slow down") can be communicated to the instrument panel cluster 40. Additionally or alternatively, the black ice warning light or indicator 68 can be illuminated. In other examples, the message can be related to a vehicle speed. In this regard, if control determines that a safe speed has been attained (below a safe speed threshold), a different message can be displayed or the message could be delivered differently (e.g., flashing, constant, with or without audio, etc.). The driver can be alerted in other ways too, such as at a heads up display, or haptic feedback on the steering wheel 70 and/or driver seat. In other implementations the warning can be based on a severity level of black ice detection (e.g., flashing/audio level, etc.).

At 230 control performs corrective actions. In examples, control can alter a drive mode of the vehicle. For example, the controller 82 can change a drive mode from a two-wheel drive mode to an all-wheel drive or four-wheel drive mode. Additionally or alternatively, the controller 82 can command the driveline 16 to operate with more torque delivered to the front wheels 58A, 58B. In additional examples, the controller 82 can set the vehicle speed to a speed determined safe for driving conditions (e.g., lower than posted speed limits). In additional implementations, the controller 82 can increase sensitivity of the traction controller/ABS 32 based on black ice detection. In examples, the sensitivity can be increased proportionally to a severity level of black ice that has been detected. Control ends at 240.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle system for a vehicle that detects and reacts to a black ice driving condition, the vehicle system comprising:
    a motor that provides drive torque to a driveline that drives vehicle wheels for propelling the vehicle, the vehicle wheels including left and right rear wheels and left and right front wheels;
    at least one sensor including an advanced driver assistance system (ADAS) having a camera that generates a video input signal;
    an instrument panel cluster configured to convey a message indicative of a black ice driving condition; and
    a controller that:
        receives the video input signal;
        determines whether a black ice condition has been satisfied based on a determination, from the video input signal, that water splashing is initially detected from a nearby vehicle and subsequently not detected from the nearby vehicle;
        communicates, based on the black ice condition being satisfied, a signal to the instrument panel cluster for displaying a black ice driving condition; and
        commands, at the driveline, a corrective action based on the black ice condition being satisfied.

2. The vehicle system of claim 1, wherein the at least one sensor further comprises a yaw sensor that provides a yaw sensor signal and wherein the controller further determines whether the black ice conditions have been satisfied based on the yaw sensor signal.

3. The vehicle system of claim 1, wherein the at least one sensor further comprises a temperature sensor that provides a temperature sensor signal and wherein the controller further determines whether the black ice conditions have been satisfied based on the temperature sensor signal.

4. The vehicle system of claim 3, wherein the at least one sensor further comprises at least one of a humidity sensor that provides a humidity sensor signal, a rain sensor that provides a rain sensor signal, and a windshield wiper sensor that provides a windshield wiper sensor signal, and wherein the controller further determines whether the black ice conditions have been satisfied based on at least one of the humidity sensor signal, the rain sensor signal, and the windshield wiper sensor signal.

5. The vehicle system of claim 1, wherein the at least one sensor further comprises wheel speed sensors configured at each of the left and right rear wheels and the left and right front wheels, and wherein the controller determines whether the black ice conditions have been satisfied based on a wheel speed sensor having a distinct wheel speed signal compared to a remainder of the wheel speed sensors.

6. The vehicle system of claim 1, wherein the controller commands a corrective action at the driveline including commanding a mode change from a two-wheel drive mode to one of an all-wheel drive mode and a four-wheel drive mode.

7. The vehicle system of claim 1, wherein the controller commands a corrective action at the driveline including commanding more drive torque at the left and right front wheels than the left and right rear wheels.

8. A method for detecting and reacting to a black ice driving condition on a vehicle, the vehicle having: a motor that provides drive torque to a driveline that drives vehicle wheels for propelling the vehicle, the vehicle wheels including left and right rear wheels and left and right front wheels; at least one sensor including an advanced driver assistance system (ADAS) having a camera that generates a video input signal; an instrument panel cluster configured to display a message indicative of a black ice driving condition; and a controller, the method comprising:
    receiving the video input signal;
    determining, based on the video input signal, whether a black ice condition has been satisfied based on a determination that at least one of: (i) water splashing is initially detected from a nearby vehicle and subsequently not detected from the nearby vehicle, and (ii) tire marks are initially detected on a roadway from a nearby vehicle and subsequently not detected from the nearby vehicle;
    communicating, based on the black ice condition being satisfied, a signal to the instrument panel cluster for conveying a black ice driving condition; and
    commanding, at the driveline, a corrective action based on the black ice condition being satisfied.

9. The method of claim 8, wherein the at least one sensor further comprises a yaw sensor that provides a yaw sensor signal and wherein the controller further determines whether the black ice conditions have been satisfied based on the yaw sensor signal.

10. The method of claim 8, wherein the at least one sensor further comprises a temperature sensor that provides a temperature sensor signal and wherein the controller further determines whether the black ice conditions have been satisfied based on the temperature sensor signal.

11. The method of claim 10, wherein the at least one sensor further comprises at least one of a humidity sensor that provides a humidity sensor signal, a rain sensor that provides a rain sensor signal, and a windshield wiper sensor that provides a windshield wiper sensor signal, and wherein the controller further determines whether the black ice conditions have been satisfied based on at least one of the humidity sensor signal, the rain sensor signal, and the windshield wiper sensor signal.

12. The method of claim 8, wherein the at least one sensor further comprises wheel speed sensors configured at each of the left and right rear wheels and the left and right front wheels, and wherein the controller determines whether the black ice conditions have been satisfied based on a wheel speed sensor having a distinct wheel speed signal compared to a remainder of the wheel speed sensors.

13. The method of claim 8, wherein the controller commands a corrective action at the driveline including commanding a mode change from a two-wheel drive mode to one of an all-wheel drive mode and a four-wheel drive mode.

14. The method of claim 8, wherein the controller commands a corrective action at the driveline including commanding more drive torque at the left and right front wheels than the left and right rear wheels.

15. A vehicle system for a vehicle that detects and reacts to a black ice driving condition, the vehicle system comprising:
    a motor that provides drive torque to a driveline that drives vehicle wheels for propelling the vehicle, the vehicle wheels including left and right rear wheels and left and right front wheels;

at least one sensor including an advanced driver assistance system (ADAS) having a camera that generates a video input signal;

an instrument panel cluster configured to convey a message indicative of a black ice driving condition; and a controller that:

receives the video input signal;

determines whether a black ice condition has been satisfied based on a determination, from the video input signal, that tire marks are initially detected on a roadway from a nearby vehicle and subsequently not detected from the nearby vehicle;

communicates, based on the black ice condition being satisfied, a signal to the instrument panel cluster for displaying a black ice driving condition; and commands, at the driveline, a corrective action based on the black ice condition being satisfied.

16. The vehicle system of claim 15, wherein the at least one sensor further comprises a yaw sensor that provides a yaw sensor signal and wherein the controller further determines whether the black ice conditions have been satisfied based on the yaw sensor signal.

17. The vehicle system of claim 15, wherein the at least one sensor further comprises a temperature sensor that provides a temperature sensor signal and wherein the controller further determines whether the black ice conditions have been satisfied based on the temperature sensor signal.

18. The vehicle system of claim 15, wherein the at least one sensor further comprises at least one of a humidity sensor that provides a humidity sensor signal, a rain sensor that provides a rain sensor signal, and a windshield wiper sensor that provides a windshield wiper sensor signal, and wherein the controller further determines whether the black ice conditions have been satisfied based on at least one of the humidity sensor signal, the rain sensor signal, and the windshield wiper sensor signal.

19. The vehicle system of claim 15, wherein the at least one sensor further comprises wheel speed sensors configured at each of the left and right rear wheels and the left and right front wheels, and wherein the controller determines whether the black ice conditions have been satisfied based on a wheel speed sensor having a distinct wheel speed signal compared to a remainder of the wheel speed sensors.

\* \* \* \* \*